(12) United States Patent
Han

(10) Patent No.: US 12,503,357 B2
(45) Date of Patent: Dec. 23, 2025

(54) OPTICAL MEMS BASED INTRACRANIAL PRESSURE AND INTRACRANIAL TEMPERATURE MONITOR

(71) Applicant: Naiqian Han, Riverside, CA (US)

(72) Inventor: Naiqian Han, Riverside, CA (US)

( * ) Notice: Subject to any disclaimer, the term of this patent is extended or adjusted under 35 U.S.C. 154(b) by 911 days.

(21) Appl. No.: 17/524,786

(22) Filed: Nov. 12, 2021

(65) Prior Publication Data

US 2022/0153571 A1 May 19, 2022

Related U.S. Application Data

(60) Provisional application No. 63/113,883, filed on Nov. 15, 2020, provisional application No. 63/113,882, filed on Nov. 15, 2020.

(51) Int. Cl.
*B81B 3/00* (2006.01)
*G01J 3/02* (2006.01)
*G01J 3/10* (2006.01)
*G01J 3/45* (2006.01)
*G02B 27/30* (2006.01)

(52) U.S. Cl.
CPC .......... *B81B 3/0021* (2013.01); *B81B 3/0024* (2013.01); *G01J 3/021* (2013.01);
(Continued)

(58) Field of Classification Search
CPC ................ B81B 3/0021; B81B 3/0024; B81B 2201/0264; B81B 2201/0271;
(Continued)

(56) References Cited

U.S. PATENT DOCUMENTS

| 6,218,661 | B1 | 4/2001 | Schroeder et al. |
| 2012/0050735 | A1* | 3/2012 | Higgins ................ G01L 1/24 |
| | | | 356/326 |

(Continued)

FOREIGN PATENT DOCUMENTS

| CN | 102499665 A | 6/2012 |
| CN | 108592962 A | 9/2018 |

OTHER PUBLICATIONS

International Search Report and written opinion of PCT Patent Application No. PCT/US2021/059042 issued on Feb. 4, 2022.
(Continued)

*Primary Examiner* — Jennifer D. Carruth
(74) *Attorney, Agent, or Firm* — Westbridge IP LLC

(57) ABSTRACT

The present invention discloses an optical MEMS based intracranial pressure (ICP) and intracranial temperature (ICT) monitor, comprising: a broadband light source, a tunable optical filter (TOF), an optical etalon, a plurality of optical receivers, a plurality of optical couplers, and a probe; wherein the probe comprises an ICP sensor and an ICT sensor; ICP is obtained by a depression wavelength of a reflection spectrum of the ICP sensor, the depression wavelength is obtained by comparing with a periodic spectrum with an absolute wavelength mark of an optical etalon; and ICT is obtained by a peak wavelength of a reflection spectrum of the ICT sensor, the peak wavelength is obtained by comparing with a periodic spectrum with an absolute wavelength mark of an optical etalon. The present application can precisely monitor ICP and ICT.

11 Claims, 4 Drawing Sheets

(52) U.S. Cl.
CPC ............... *G01J 3/0218* (2013.01); *G01J 3/10* (2013.01); *G01J 3/45* (2013.01); *B81B 2201/0264* (2013.01); *B81B 2201/0271* (2013.01); *B81B 2201/0278* (2013.01); *B81B 2201/047* (2013.01); *G02B 27/30* (2013.01)

(58) Field of Classification Search
CPC ....... B81B 2201/0278; B81B 2201/047; G01J 3/021; G01J 3/0218; G01J 3/10; G01J 3/45; G02B 27/30; G02B 5/1828; G02B 5/1861

See application file for complete search history.

(56) References Cited

U.S. PATENT DOCUMENTS

| | | |
|---|---|---|
| 2015/0309306 A1 | 10/2015 | Murarka et al. |
| 2016/0085066 A1 | 3/2016 | Graves et al. |
| 2016/0262627 A1* | 9/2016 | Hecker .................. A61B 5/205 |
| 2016/0380404 A1* | 12/2016 | Bulovic ................ G01L 9/0005 372/20 |
| 2019/0006157 A1* | 1/2019 | O'Banion ......... H01L 21/67109 |
| 2019/0293923 A1 | 9/2019 | Ghahremani et al. |
| 2019/0328249 A1* | 10/2019 | Lee ........................ A61B 5/031 |
| 2020/0041728 A1 | 2/2020 | Spector et al. |
| 2020/0049891 A1* | 2/2020 | Menard .................. H01S 5/021 |

OTHER PUBLICATIONS

International Search Report and written opinion of PCT Patent Application No. PCT/US2021/059299 issued on Feb. 9, 2022.

First Office Action issued in counterpart Chinese Patent Application No. 202180076634.3, dated Aug. 19, 2025.

* cited by examiner

OPTICAL MEMS BASED INTRACRANIAL PRESSURE AND INTRACRANIAL TEMPERATURE MONITOR

CROSS-REFERENCE TO RELATED APPLICATION

This application claims priority date of U.S. Provisional Patent Application No. 63/113,883, filed Nov. 15, 2020, and U.S. Provisional Patent Application No. 63/113,882, filed Nov. 15, 2020, by the Applicants of this Formal Patent Application. The contents of which are herein incorporated by reference in their entireties.

TECHNICAL FIELD

The present application relates to the field of neurosurgery, in particular to an optical MEMS based intracranial pressure (ICP) and temperature (ICT) monitor.

BACKGROUND

In an intracalvarium, there are brain tissue, cerebrospinal fluid and blood. The three kinds of material maintain ICP stability. All the three material are not compressible. High ICP without being treated in time deforms the brain tissue permanently and kills a patient. The invasive ICP monitoring is a medical gold standard.

The earliest invasive ICP monitor in history is made of bubble connected with an 1.5-meter-long tube. The bubble placed in the intracalvarium senses the ICP and transmits the pressure signal through the tube. At other side of the tube, a pressure sensor is applied to monitor the pressure. The bubble is too big which is not convenient to operate.

The piezoelectric ICP monitor and the piezoresistance ICP monitor were invented afterwards. The two electric-based MEMS ICP monitors are interfered with electromagnetic wave. The probes have unexpected false image under computed tomography (CT) or magnetic resonance imaging (MRI). More seriously, the huge current generated by the strong electromagnetic wave of MRI can move the probe in the head and destroy the probe, so that the implanted probe has to be taken out of the patient's head which is very troublesome.

The recently developed ICP monitor is optical MEMS based. The light is directed by optical fiber and hits the membrane of the ICP sensor. The ICP changes the shape of the membrane, so that the light power reflected by the membrane changes. By monitoring the light power, the system can tell the ICP. This ICP monitor is not affected by electromagnetic wave. However, the unexpected bend of the optical fiber occasionally happens, which changes the light power, thus resulting interference of the ICP to be monitored.

All the ICT sensors so far are electric-based thermistors.

Therefore, there is an urgent need for developing a new ICP and ICT monitor base on optical MEMS, which is electric-free, and does not rely on the power of light, so that the detection of ICP and ICT would not be affected by electromagnetic wave or the bending of optical fiber.

SUMMARY

The disclosure provides an optical MEMS based ICP and ICT monitor, aiming to solve the problems that the detection of ICP and ICT are affected by electromagnetic wave or the bending of optical fiber in the prior art.

An optical MEMS based ICP and ICT monitor according to an embodiment of the disclosure, including:
a broadband light source, a tunable optical filter (TOF), an optical etalon, a plurality of optical receivers, a plurality of optical couplers, and a probe;
wherein the probe comprises an ICP sensor and an ICT sensor; and the ICP is obtained by a depression wavelength of a reflection spectrum of the ICP sensor, the depression wavelength is obtained by comparing with a periodic spectrum with an absolute wavelength mark of an optical etalon;
ICT is obtained by a peak wavelength of a reflection spectrum of the ICT sensor, the peak wavelength is obtained by comparing with a periodic spectrum with an absolute wavelength mark of an optical etalon.

In the above optical MEMS based ICP and ICT monitor of the present application, the optical etalon with an absolute wavelength mark is configured to generate a periodic spectrum as a ruler to measure the absolute peak or depression wavelength in the reflection spectrum of the ICP or ICT sensor.

In the above optical MEMS based ICP and ICT monitor of the present application, the ICP sensor and the ICT sensor are integrated in one probe and are connected with two single mode optical fibers in parallel.

In the above optical MEMS based ICP and ICT monitor of the present application, the ICP sensor and the ICT sensor are integrated in one probe and are connected with one single mode optical fiber in series.

In the above optical MEMS based ICP and ICT monitor of the present application, the ICP sensor is a MEMS resonator structure formed by a single mode optical fiber a MEMS membrane and a glass substrate, and a tip of the single mode optical fiber acts as a mirror; the MEMS membrane deforms slightly due to the ICP; the depression wavelength of the reflection spectrum of the ICP sensor is configured to monitor the ICP.

In the above optical MEMS based ICP and ICT monitor of the present application, the ICP sensor is a MEMS resonator structure formed by a single mode optical lensed fiber, a MEMS membrane and a glass substrate, and a tip of the single mode optical lensed fiber acts as a mirror; the MEMS membrane deforms slightly due to the ICP; the depression wavelength of the reflection spectrum of the ICP sensor is configured to monitor the ICP.

In the above optical MEMS based ICP and ICT monitor of the present application, the ICP sensor is a MEMS resonator structure formed by a single mode optical fiber collimator, a MEMS membrane and a glass substrate, and a lens plane of the single mode optical fiber collimator acts as a mirror; the MEMS membrane deforms slightly due to the ICP; the depression wavelength of the reflection spectrum of the ICP sensor is configured to monitor the ICP.

In the above optical MEMS based ICP and ICT monitor of the present application, the ICT sensor is an optical fiber Bragg grating; the peak wavelength of the reflection spectrum of the ICT sensor is configured to monitor the ICT.

In the above optical MEMS based ICP and ICT monitor of the present application, the ICT sensor is a MEMS resonator structure formed by a single mode optical fiber, a MEMS membrane and a glass substrate, and a tip of mode optical fiber acts as a mirror; the MEMS membrane deforms slightly due to the ICT; the depression wavelength of the reflection spectrum is configured to monitor the ICT.

In the above optical MEMS based ICP and ICT monitor of the present application, the ICT sensor is a resonator structure formed by a single mode optical fiber, a second mirror and a glass substrate, and a tip of the single mode optical fiber acts as a mirror; a cavity length of the resonator structure changes with the ICT; the depression wavelength of the reflection spectrum is configured to monitor the ICT.

In the above optical MEMS based ICP and ICT monitor of the present application, the optical couplers are used to connect all optical components and sensors.

In the above optical MEMS based ICP and ICT monitor of the present application, the optical coupler can be replaced by an optical circulator.

In the above optical MEMS based ICP and ICT monitor of the present application, the combination of the broadband light source and the TOF can be replaced by a tunable laser source.

According to the optical MEMS based ICP and ICT monitor of the present application, the broadband light transmitted along a single mode optical fiber reaches a TOF and is scanned. Then, the scanned broadband light is separated into two optical paths. One path of the goes to the optical MEMS sensors to get the depression or the peak wavelength of the transmission, the reflection or the interference spectrum. Another goes to an optical etalon to capture the periodic spectrum with absolute wavelength mark as a ruler. The peak or depression wavelength can be precisely measured by comparing it with the ruler. Thereby, the parameter to be monitored is obtained.

BRIEF DESCRIPTION OF THE REFERENCE AND DRAWINGS

REFERENCE SIGNS IN THE DESCRIPTION ARE AS FOLLOWS

1. Broadband light source; 2. Tunable optical filter (TOF); 3. Optical etalon; 4. Optical receiver; 5. Optical coupler; 6. Probe;
61. Intracranial pressure (ICP) sensor; 62. Intracranial temperature (ICT) sensor;
611. Single mode optical fiber; 6111. Fiber tip;
612. MEMS membrane;
613. Glass tube.

DETAILED DESCRIPTION OF THE PREFERRED EMBODIMENT

The preferred embodiments of the present disclosure are described in detail with reference to the accompanying drawings. It should be understood that the preferred embodiments described below are merely used to illustrate and explain the present disclosure, and not intended to limit the present disclosure.

Figure 1:
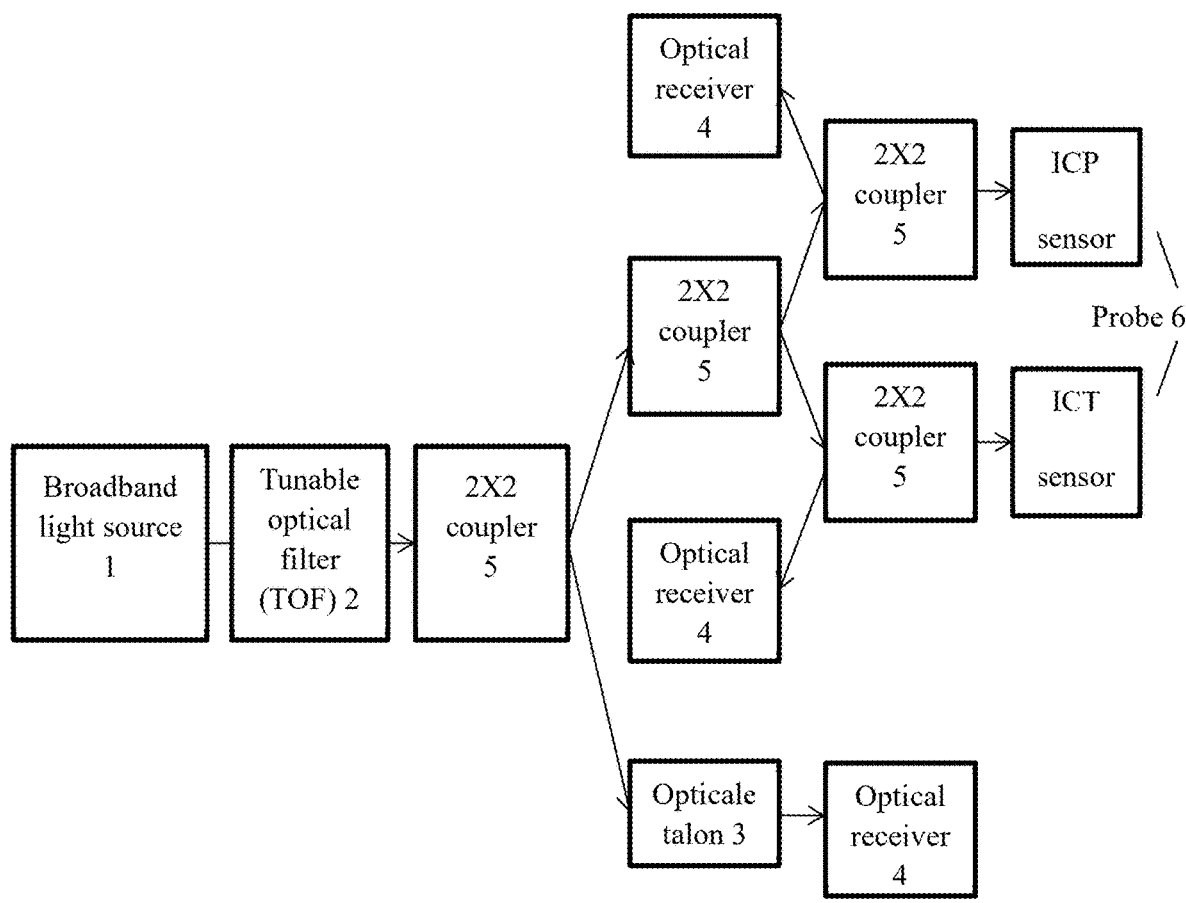
FIG. 1 is a structural schematic diagram of an optical MEMS based ICP and ICT monitor according to an embodiment of the present disclosure.

In an embodiment, as shown in FIG. 1, the schematic diagram illustrating the structure of the optical MEMS based ICP and ICT monitor provided by an embodiment of the disclosure, including:
  a broadband light source 1, a tunable optical filter 2 (TOF 2), an optical etalon 3, a plurality of optical receivers 4, a plurality of optical couplers 5, and a probe 6
  wherein the probe 6 comprises an intracranial pressure (ICP) sensor 61 and an intracranial temperature (ICT) sensor 62; and ICP is obtained by a depression wavelength of a reflection spectrum of the ICP sensor 61, the depression wavelength is obtained by comparing with a periodic spectrum with an absolute wavelength mark of an optical etalon 3;

ICT is obtained by a peak wavelength of a reflection spectrum of the ICT sensor 62, the peak wavelength is obtained by comparing with a periodic spectrum with an absolute wavelength mark of an optical etalon 3.

The optical etalon 3 with an absolute wavelength mark is configured to generate a periodic spectrum as a ruler to measure the absolute peak or depression wavelength in the reflection spectrum of the ICP or ICT sensor 62.

Specifically, the broadband light is input to the TOF 2 through the single mode optical fiber 611 and is scanned by the TOF 2, then the scanned light is separated into two optical paths by an optical coupler 5. One path of the broadband light scanned by the TOF 2 hits the ICP and ICT sensors 62 and is reflected back to two optical receivers 4 with the aid of the plurality of optical couplers 5. The peak or depression wavelength of the two reflection spectra of the ICP and ICT sensors 62 can be captured. Another path of the scanned broadband light hits the optical etalon 3 and is reflected back to an optical receiver 4 with the aid of the plurality of optical couplers 5, so that the periodic spectrum with absolute wavelength mark as a rule is received. By comparing the peak or depression wavelength with the ruler, the system can tell the wavelength. Accordingly, the parameter to be monitored is obtained.

In an embodiment, the ICP sensor 61 and the ICT sensor 62 are integrated in one probe 6; the ICP sensor 61 is a MEMS resonator structure formed by a single mode optical fiber 611, a MEMS membrane 612 and a glass tube 613, and a tip 6111 of the single mode optical fiber 611 acts as a mirror; the MEMS membrane 612 deforms slightly due to the ICP; the depression wavelength of the reflection spectrum of the ICP sensor 61 is configured to monitor the ICP; the ICT sensor 62 is an optical fiber Bragg grating; the peak wavelength of the reflection spectrum of the ICT sensor 62 is configured to monitor the ICT.

Figure 2:
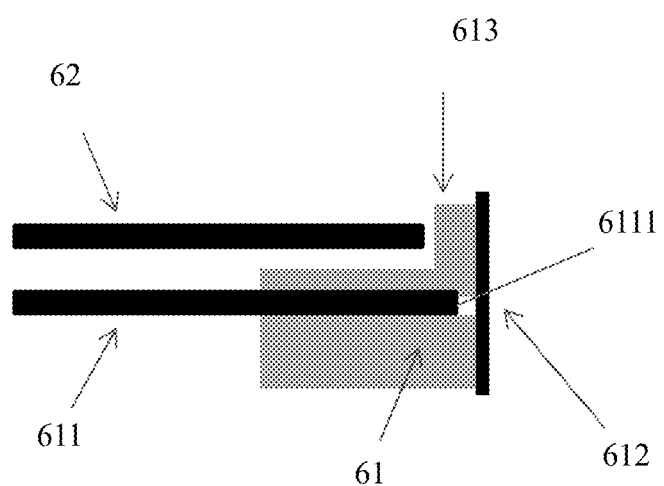
FIG. 2 is a cross sectional view of the probe integrated with an ICP sensor and an ICT sensor based on FBG according to an embodiment of the present disclosure.

As shown in FIG. 2, a cross sectional view of the probe 6 integrated by an ICP sensor 61 and an ICT sensor 62 based on FBG. The ICP sensor 61 is a MEMS resonator structure formed by the tip 6111 of a single mode optical fiber 611, a membrane and a glass tube 613. The MEMS membrane 612 deforms along with the changes of ICP, so that the ICP sensor's 61 depression wavelength of the reflection spectrum changes. The ICT sensor 62 is formed by an optical fiber Bragg grating. The peak wavelength of the reflection spectrum of the ICT sensor 62 changes due to the ICT, which is used as the parameter indicating the ICT.

Similarity, the ICT sensor 62 is a MEMS resonator structure formed by a single mode optical fiber 611, a MEMS membrane 612 and a glass tube 613, and a tip 6111 of single mode optical fiber 611 acts as a mirror; the MEMS membrane 612 deforms slightly due to the ICT; the depression wavelength of the reflection spectrum is configured to monitor the ICT.

The ICT sensor 62 has the same structure as the ICP sensor 61 where its resonator cavity length changes with the temperature.

The ICT sensor 62 may also made of optical fiber Bragg grating, where the peak wavelength of the reflection optical spectrum of the fiber Bragg grating changes with the ICT. By monitoring the wavelength, the system can tell the ICT.

Figure 3:
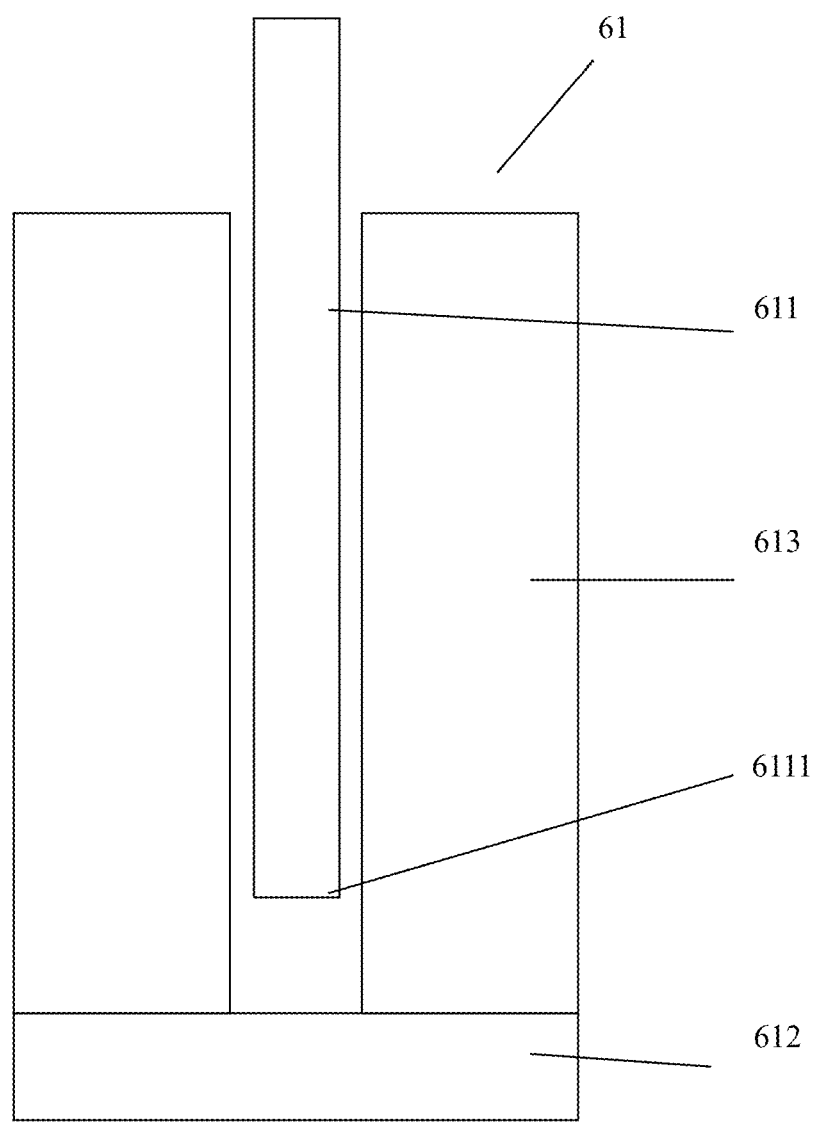
FIG. 3 is a cross sectional view of an ICP sensor with a MEMS membrane and a single mode optical fiber whose tip is used as one mirror of the MEMS resonator, according to an embodiment of the present disclosure.

In another embodiment, as shown in FIG. 3, a cross sectional view of an ICP sensor 61 with a MEMS membrane 612 and a single mode optical fiber 611 whose tip 6111 is used as a mirror of the MEMS resonator. The glass tube 613 holds all the components. The ICP causes the MEMS membrane 612 to deform slightly, which leads to the changes of the depression wavelength in the reflection optical spectrum. By measuring the wavelength, the pressure can be determined.

Figure 4:
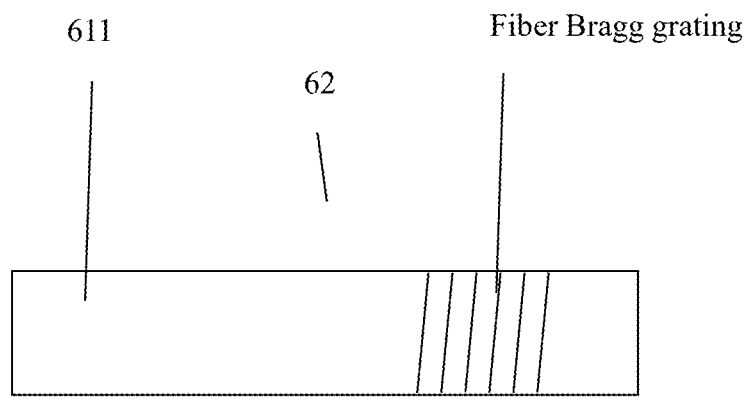
FIG. 4 is a cross sectional view of an ICT sensor formed by an optical fiber Bragg grating according to an embodiment of the present disclosure.

In another embodiment, as shown in FIG. 4, a cross sectional view of an ICT sensor 62 with fiber Bragg grating in a single mode optical fiber 611. The ICT sensor 62 is a fiber Bragg grating with a peak shape in the reflection spectrum. When the ICT changes, the peak wavelength changes. By measuring the wavelength, the ICT can be obtained.

Figure 5A:
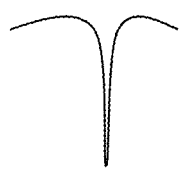
FIG. 5 shows the reflection spectrum of the ICP sensor and the reflection spectrum of the ICT sensor according to an embodiment of the present disclosure
Figure 5B:
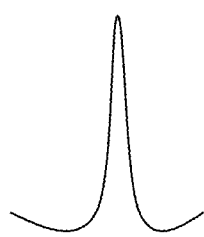

In an embodiment, as shown in FIG. 5, the shapes of the reflection spectrum of the ICP sensor 61 and the reflection spectrum of the ICT sensor 62. The depression wavelength in the reflection spectrum of the ICP sensor 61 is shown in FIG. 5A. By figuring out the depression wavelength, the system can obtain the ICP to be monitored. The peak wavelength of the reflection spectrum of the ICT sensor 62 is shown in FIG. 5B. By figuring out the peak wavelength, the system can obtain the ICT to be monitored.

In an embodiment, the thermal effect of the TOF 2, the optical etalon 3 and the fiber Bragg grating can be compensated by an electronic temperature sensor.

In an embodiment, the ICP and ICT monitor, the optical coupler 5 connected to the probe 6 can be replaced by optical circulator.

In an embodiment, the combination of the broadband light source 1 and the TOF 2 can be replaced by a tunable laser source.

In other embodiment, the optical MEMS based ICP and ICT monitor provided by the present application can be used for the detection of a group of vital signs such as the heart rate, the breathe rate, etc. Since the heartbeat or the breathe causes the ICP and ICT changes, by analyzing the ICP and ICT, the heart rate, the breathe rate, etc. can be figured out.

According to the upgrade design of the optical MEMS based ICP and ICT monitor and its probe 6, the probe 6 is integrated with an optical MEMS based ICP sensor 61, and an optical fiber Bragg grating based ICT sensor 62. All the optical components and optical sensors are connected with single mode optical fibers 611. The peak or depression wavelength of the transmission, the reflection or the interference spectrum of the sensors is a function of the ICP or ICT parameter to be monitored. The wavelength can be figured out by comparing it with the comb-liked periodic spectrum with an absolute wavelength mark of the optical etalon 3. Once the peak or depression wavelength is known, the parameter to be monitored is obtained.

The above are only preferred embodiments of the present application, not intended to limit the application. Any modifications, equivalent substitutions and improvements made within the spirit and principles of the application shall be included in the protection scope of this application.

What is claimed is:

1. An optical MEMS based intracranial pressure (ICP) and temperature (ICT) monitor, comprising:
    a broadband light source, a tunable optical filter (TOF), an optical etalon, a plurality of optical receivers, a plurality of optical couplers, and a probe;
    wherein the probe comprises an intracranial pressure (ICP) sensor and an intracranial temperature (ICT) sensor;
    ICT is obtained by a peak wavelength of a reflection spectrum of the ICT sensor, the peak wavelength is obtained by comparing with a periodic spectrum with an absolute wavelength mark of an optical etalon;
    ICP is obtained by a depression wavelength of a reflection spectrum of the ICP sensor, the depression wavelength is obtained by comparing with a periodic spectrum with an absolute wavelength mark of an optical etalon;
    the optical etalon with an absolute wavelength mark is configured to generate a periodic spectrum as a ruler to measure the absolute peak or depression wavelength in the reflection spectrum of the ICP or ICT sensor;
    the ICP sensor and the ICT sensor are integrated in one probe and are connected with two single mode optical fibers in parallel; and
    the ICP sensor is a MEMS resonator structure formed by a single mode optical fiber, a MEMS membrane and a glass substrate, and a tip of the single mode optical fiber acts as a mirror; the MEMS membrane deforms slightly due to the ICP; the depression wavelength of the reflection spectrum of the ICP sensor is configured to monitor the ICP.

2. The optical MEMS based ICP and ICT monitor of claim 1, wherein:
    the ICP sensor and the ICT sensor are integrated in one probe and are connected with one single mode optical fiber in series.

3. The optical MEMS based ICP and ICT monitor of claim 1, wherein the ICP sensor is a MEMS resonator structure formed by a single mode optical lensed fiber, a MEMS membrane and a glass substrate, and a tip of the single mode optical lensed fiber acts as a mirror; the MEMS membrane deforms slightly due to the ICP: the depression wavelength of the reflection spectrum of the ICP sensor is configured to monitor the ICP.

4. The optical MEMS based ICP and ICT monitor of claim 1, wherein the ICP sensor is a MEMS resonator structure formed by a single mode optical fiber collimator, a MEMS membrane and a glass substrate, and a lens plane of the single mode optical fiber collimator acts as a mirror: the MEMS membrane deforms slightly due to the ICP: the depression wavelength of the reflection spectrum of the ICP sensor is configured to monitor the ICP.

5. The optical MEMS based ICP and ICT monitor of claim 1, wherein the ICT sensor is an optical fiber Bragg grating: the peak wavelength of the reflection spectrum of the ICT sensor is configured to monitor the ICT.

6. The optical MEMS based ICP and ICT monitor of claim 1, wherein the ICT sensor is a MEMS resonator structure formed by a single mode optical fiber, a MEMS membrane and a glass substrate, and a tip of single mode optical fiber acts as a mirror; the MEMS membrane deforms slightly due to the ICT: the depression wavelength of the reflection spectrum is configured to monitor the ICT.

7. The optical MEMS based ICP and ICT monitor of claim 1, wherein the ICT sensor is a resonator structure formed by a single mode optical fiber, a second mirror and a glass substrate, and a tip of the single mode optical fiber acts as a mirror; a cavity length of the resonator structure changes with the ICT: the depression wavelength of the reflection spectrum is configured to monitor the ICT.

8. The optical MEMS based ICP and ICT monitor of claim 1, wherein the optical couplers are used to connect all optical components and sensors.

9. The optical MEMS based ICP and ICT monitor of claim 1, wherein the optical coupler can be replaced by an optical circulator.

10. The optical MEMS based ICP and ICT monitor of claim 1, wherein the combination of the broadband light source and the TOF can be replaced by a tunable laser source.

11. The optical MEMS based ICP and ICT monitor of claim 1, wherein the optical MEMS based ICP and ICT monitor is used to analyze the ICP and ICT, a group of vital signs can be obtained, the vital signs comprise at least heart rate and breathe rate.

* * * * *